United States Patent [19]

Hiramatsu et al.

[11] Patent Number: 4,529,284
[45] Date of Patent: Jul. 16, 1985

[54] ELECTROMAGNETIC RELEASE DEVICE

[75] Inventors: Akira Hiramatsu, Kanagawa; Yoichi Tosaka, Tokyo; Masayuki Suzuki, Kanagawa, all of Japan

[73] Assignee: Canon Kabushiki Kaisha, Tokyo, Japan

[21] Appl. No.: 435,635

[22] Filed: Oct. 21, 1982

[30] Foreign Application Priority Data

Oct. 29, 1981 [JP] Japan ................................ 56-173560

[51] Int. Cl.³ ........................ G03B 9/08; G03B 17/38
[52] U.S. Cl. .................................. 354/234.1; 354/266
[58] Field of Search ..................... 354/152, 153, 234.1, 354/235.1, 173.11, 205, 207, 266

[56] References Cited

U.S. PATENT DOCUMENTS

| | | | |
|---|---|---|---|
| 3,994,003 | 11/1976 | Iwashita et al. | 354/214 X |
| 4,313,661 | 2/1982 | Yamamichi | 354/266 X |
| 4,346,972 | 8/1982 | Takahashi | 354/400 |
| 4,403,844 | 9/1983 | Namai | 354/266 X |
| 4,410,252 | 10/1983 | Yoshikawa et al. | 354/153 |

Primary Examiner—John Gonzales
Attorney, Agent, or Firm—Toren, McGeady, Stanger, Goldberg & Kiel

[57] ABSTRACT

In the disclosed camera an electromagnetic device serves to actuate a shutter release mechanism, and a drive is arranged repeatedly to drive the electromagnetic device following a shutter release signal to permit sequential control of a plurality of actions such as a shutter release, a mirror dropping action, a film winding lock release action, etc. with a single electromagnetic device.

14 Claims, 7 Drawing Figures

ELECTROMAGNETIC RELEASE DEVICE

BACKGROUND OF THE INVENTION

1. Field of the Invention

This invention relates to cameras and particularly to an electromagnetic release device arranged with a single electromagnet to perform a number of control functions within a camera.

2. Description of the Prior Art

Generally, a single-lens reflex camera is arranged to form an image of an object to be photographed on a viewfinder and to perform the following sequence of actions. A shutter release operation causes operation of an automatic diaphragm aperture adjusting device, and at the same time, a movable mirror is lifted up to retract it from the photo-taking optical path. Following that, a shutter is operated. After completion of an exposure, the movable mirror goes back to its original position and a winding lock member which has inhibited winding of the film is unlocked to allow the next photographic operation.

Various concepts for controlling this sequence of actions electronically have been introduced of late. For example, some central control arrangements with microcomputers have been proposed to electrically control the above stated series of actions using a magnet for each of the systems including a mirror drive system, an automatic aperture adjusting system, and a shutter system. The central control arrangement with a microcomputer dispenses with mechanical arrangement for signal transfer between one functional system and another (mechanical interlocking relation). Among other advantages, this permits simplification of structural arrangement and adjustment work because each of the series of actions can be performed at times independently of another.

However, such electrical control necessitates temporary conversion of an electrical signal into a mechanical signal for actuating the shutter, the mirror, the film winding lock member, etc. This requires use of many electromagnetic mechanisms and not only complicates the internal construction of the camera but also results in an increase of space needed. The electrical control arrangement of the prior art, therefore, not only hinders efforts to reduce the size of the camera but also is disadvantageous in terms of cost.

SUMMARY OF THE INVENTION

It is a first object of the invention to provide an arrangement in which a single electromagnetic release device is arranged to perform a plurality of control functions such as control of a shutter release action, a mirror return action, a film winding lock releasing action, etc. so that the above stated shortcomings of the prior art such as complication of structural arrangement, an increase of space requirement, etc. due to an increase of the number of electromagnetic mechanisms can be eliminated.

It is a second object of the invention to provide an armature quick return mechanism which is highly suited for the above stated electromagnetic release device.

These and further objects and features of the invention will become apparent from the following detailed description of a preferred embodiment thereof taken in conjunction with the accompanying drawings.

DETAILED DESCRIPTION OF THE PREFERRED EMBODIMENT

Figure 1:
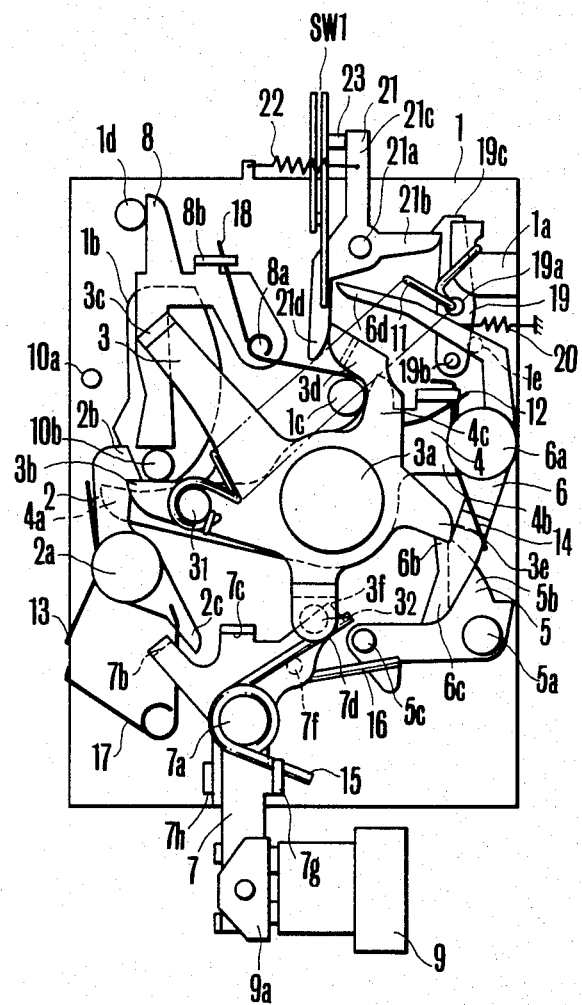
FIG. 1 is a plan view showing an electromagnetic release device according to the invention prior to the start of its operation.
Figure 2:
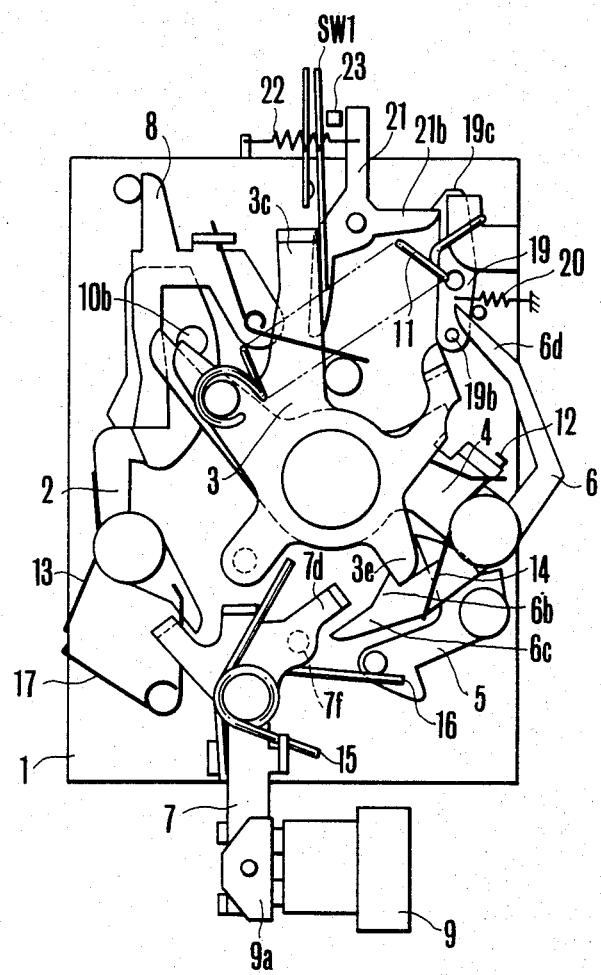
FIG. 2 is a plan view showing the electromagnetic release device of FIG. 1 with a movable mirror brought down.
Figure 3:
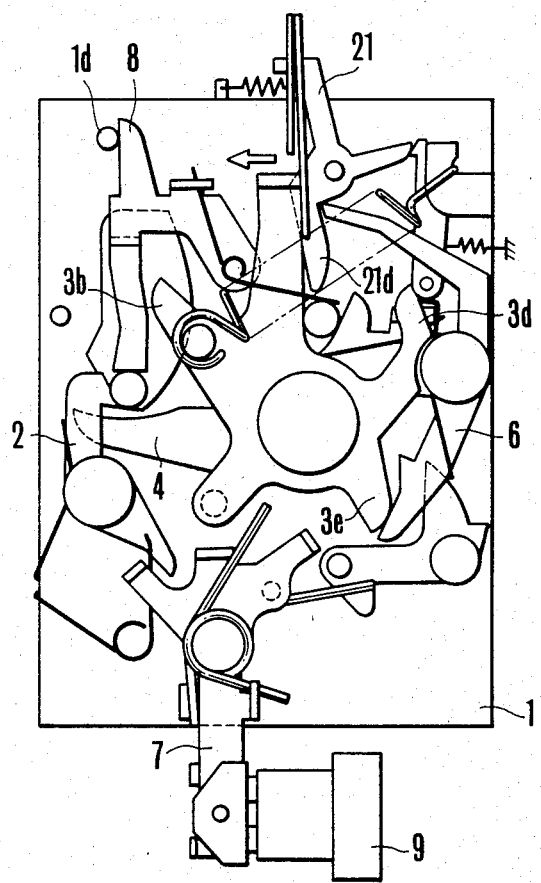
FIG. 3 shows another position of the device in FIGS. 1 and 2.

FIGS. 1, 2 and 3 show by stage the operation of an electromagnetic release device according to the invention. The embodiment of the invention includes a base plate 1 of a quick return mechanism and a first hook lever 2. The first hook lever 2 is urged by the force of a spring 13 to rotate clockwise as viewed on the drawing on a rotary shaft 2a provided on the base plate 1. Further, the lever 2 is provided with a hook part 2b which is disposed at the fore end of one of the arms of the lever extending in two directions from the rotary shaft 2a and is arranged to hook a first extending arm 3b of another lever 3 which will be described later. The other arm 2c of the lever 2 is arranged to cause the hook lever 2 to rotate counterclockwise against the force of the spring 13 by engaging a protrudent cam 7b of an operation control lever 7 which will be described.

The base plate 1 has a central lever 3 disposed thereon. The central lever 3 is urged clockwise on its rotary shaft 3a by a spring 11. The first extending arm 3b is normally in hooked engagement with the hook part 2b of the above stated first hook lever 2 under a condition before the start of the operation as shown in FIG. 1. In addition to the first extending arm 3b, the central lever 3 has four extending arms, to be described below. The spring 11 is a coiled spring stretched between a bracket 1a disposed on the base plate 1 and a pin 31 erected on the first extending arm 3b of the central lever 3. A mirror spring up lever 4 is coaxially and rotatably supported by the rotary shaft 3a together with the central lever 3 and is urged counterclockwise by a rotating force of a spring 12 which is disposed between the levers 3 and 4. A pin 6a of a second hook lever 6 is disposed at the fore end of an arm part 4b of the lever 4 extending on a side opposite to the side on which the first hook lever 2 is disposed. The second hook lever 6 is arranged to be rotatable through the pin 6a and is urged clockwise by a spring 14. The counterclockwise rotation of the spring up lever 4 is normally inhibited by hooked engagement between the fourth extending arm 3e of the central lever 3 extending on a side opposite to the extending side of the first extending arm 3b of the central lever 3 and the hook part 6b of the second hook lever 6. Accordingly, in this condition, the lever 4 rotates together with the central lever 3. However, the spring up lever 4 becomes rotatable independently of the central lever 3 when the second hook lever 6 and the central lever 3 are disengaged against the spring force of the spring 14 by a movement of an operation control lever 7 which will be described. Then, the spring up lever 4 is caused to rotate counterclockwise by the force of the spring 12 until its arm part 4c abuts a stopper 1c.

A lever 5 is arranged to be rotatable on its rotary shaft 5a provided on the base plate 1. The lever 5 is normally in a free state. However, when the spring up lever 4 rotates following the clockwise rotation of the central lever 3, the arm part 4b of the lever 4 causes the lever 5 to turn counterclockwise. Then, a pin 5c which is provided at the rotating fore end of the lever 5 charges a spring 16 which is connected to a bent flange part 7h of the operation control lever 7. The operation control lever 7 is thus urged clockwise by the force of the spring 16. The lever 5 which engages the arm part 4b of the spring up lever 4 is provided with an arm part 5b. The urging spring force of the spring 16 is normally annuled by a pin 7f which is provided on the operation control lever 7.

The embodiment further includes an electromagnet 9 which has a permanent magnet and is arranged to have its magnetizing force nullified by a power supply thereto.

The operation control lever 7 is rotatable on its rotary shaft 7a disposed on the base plate 2. The arrangement of the operation control lever 7 is as follows: One end of the lever 7 extending to the outside of the base plate 1 has an armature 9a secured thereto with the armature 9a arranged to be attracted by the electromagnet 9. The lever 7 further has a cam part 7b which is disposed on the other end extending toward the central lever 3 and is arranged to engage the arm 2c of the first hook lever 2; and another cam part 7d which is arranged to be capable of engaging the extending arm 6c of the second hook lever 6. The spring force of a spring 15 normally (under the condition as shown in FIG. 1) urges the lever 7 clockwise. However, with the armature 9a being attracted and caused to abut the magnet 9, the lever 7 is kept stationary as shown in FIG. 1. Meanwhile, the first and second hook levers 2 and 6 are separated from each other. Further, in the normal condition, one end of the spring 15 is engaging a pin 32 provided on the fifth extending arm 3f of the central lever 3 while the other end of the spring is engaging a bent flange part 7g of the operation control lever 7 to exert a rotating force in the clockwise direction on the operation control lever 7. When the clockwise rotation of the central lever 3 or the operation control lever 7 has been made to a given extent, the above stated other end engages the stopper 7c which is formed in a flange shape on the operation control lever 7 to have its spring force nullified.

The operation control lever 7 is also lightly urged by a light loading return spring 17 to rotate counterclockwise. When both the clockwise rotating forces of the springs 15 and 16 on the operation control lever 7 are nullified, the light urging force of the return spring 17 causes the lever 7 to rotate counterclockwise. With the lever 7 rotated counterclockwise, the armature 9a which has been away from the magnet 9 abuts the magnet 9.

A driving lever 10 which will be described later has a driving pin 10b erected thereon. The pin 10b engages the extending arm part 4a of the spring up lever 4. The counterclockwise rotation of the spring up lever 4 causes the driving lever 10 to retract a movable mirror to be described later away from the photo-taking optical path while pushing away a retaining lever 8 to be described later. Then, the condition shown in FIG. 1 changes to the condition shown in FIG. 2. In FIG. 3, when the spring up lever 4 is released from the pressed engagement with the driving pin 10a, the spring force of a return spring 10c, to be described below, is exerted on the driving lever 10 to bring the spring up lever 4 back to its original position.

The retaining lever 8 is arranged to prevent the movable mirror from bouncing by clamping the driving lever 10b together with the inner edge of an opening 1b provided in the base plate 1. The lever 8 is rotatably supported by a pin 8a disposed on the base plate 1. A spring 18 which has one end thereof engage the stopper 1c and has the other end engage a flange part 8b of the lever 8 urges the lever 8 to rotate counterclockwise. The retaining lever 8 is thus caused by the spring 18 to abut a stopper 1d. The driving lever 10 is provided with a rotation shaft 10a on which the driving pin 10b rotates.

A third hook lever 19 is pivotally carried by a rotary shaft 19a disposed on the base plate 1 and is caused to abut on a stopper 1e by a spring 20 which urges it counterclockwise. The third hook lever 19 has a pin 19b which is arranged to be engageable with the extending arm 6d of the second hook lever 6. Meanwhile, the other extending arm 6c of the second hook lever 6 is arranged to be pushed by the operation control lever 7 to rotate counterclockwise. With the extending arm 6c rotated counterclockwise, it disengages from the central lever 3. At that time, the pin 19b is pushed to rotate the third hook lever 19 clockwise against the force of the spring 20. A film winding lock releasing lever 21 is pivotally carried by a shaft 21a disposed on the base plate 1. A spring 22 urges the lever 21 counterclockwise. This urging force of the spring 22 causes the first arm part 21b of the release lever 21 to engage a locking part 19c provided on the third hook lever 19. The lever 21 is thus kept in the state as shown in FIG. 1. The winding lock releasing lever 21 is further provided with a second arm part 21c and a third arm part 21d. The second arm part 21c is arranged to engage a connecting lever 23. When the first arm part 21b disengages from the third hook lever 19 and the spring 22 causes the winding lock release lever 21 to rotate counterclockwise, the second arm part 21c is pushed to the left to release a winding lock lever which will be described later. The third arm part 21d is arranged to engage the third extending arm 3d of the central lever 3. In film winding, the arm 3d causes the release lever 21 to rotate clockwise against the force of the spring 22.

A switch SW1 which is normally closed and is arranged to open when the movable mirror is uplifted engages the second extending arm 3c of the central lever 3 when the second extending arm 3c rotates. Then, a signal representative of completion of the uplift of the main movable mirror is produced to permit operation of the shutter of the camera.

Figure 4:
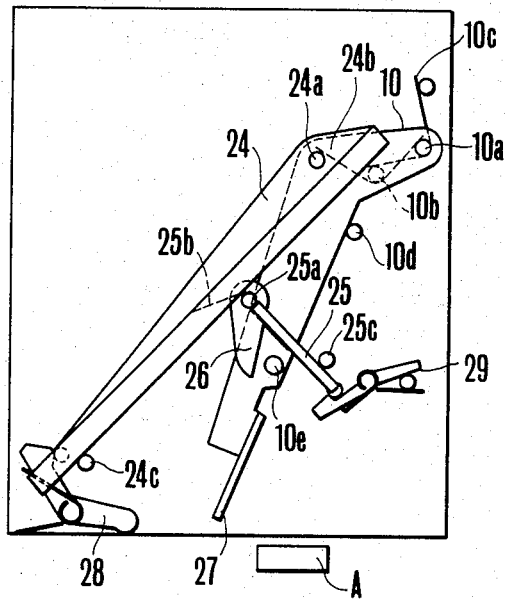
FIG. 4 is a plan view showing the movable mirror with the electromagnetic release device in the states shown in FIGS. 1 and 3.
Figure 5:
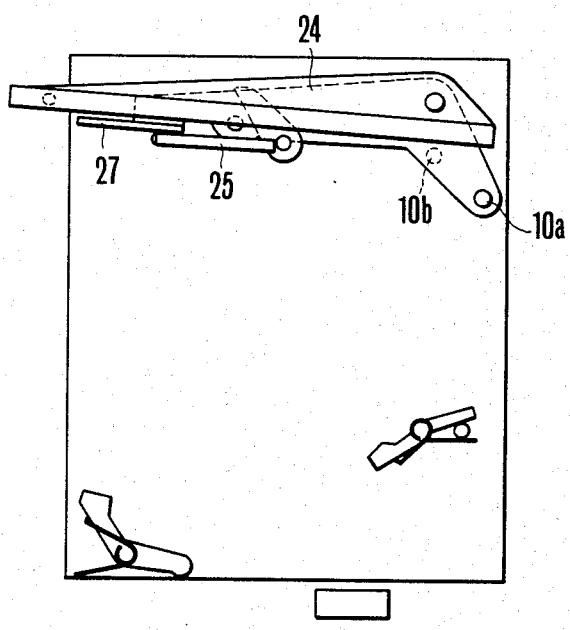
FIG. 5 is a plan view showing the movable mirror when the electromagnetic release device is in the state shown in FIG. 2.

FIGS. 4 and 5 show by state the arrangement and operation of the movable mirror to be driven by the movement of the above stated driving pin 10a. Referring to these drawings, a driving lever 10 which is pivotally carried by a shaft 10a is urged to move by a return spring 10c in the counterclockwise direction. The driving pin 10b is mounted on the lever 10. When the driving pin 10b moves from a lower position thereof shown in FIG. 1 to an upper position as shown in FIG. 2, the driving lever 10 rotates clockwise from the state shown in FIG. 4 to another state as shown in FIG. 5. The driving lever 10 is arranged to abut on a fixed pin 10d as shown in FIG. 4 against the force of a spring 10c. A reference numeral 24 denotes a main movable mirror which is rotatably carried by the driving lever 10 through a rotation shaft 24a. The main movable mirror 24 is arranged to transmit a portion of a light flux on a photo-taking optical axis while the light flux is guided by the mirror to a viewfinder optical path which is not shown. The main movable mirror 24 is urged by a spring 24 in the counterclockwise direction toward the driving lever 10 and is arranged to abut on a pin 24c. There is provided an auxiliary movable mirror 25, which is arranged to guide the portion of the light flux passed through the main movable mirror 24 to a light sensitive element A. The auxiliary movable mirror 25 is carried by said main movable mirror 24 through a rotation shaft 25a. Further, a spring 25b urges the auxiliary movable mirror 25 counterclockwise toward the main movable mirror 24 and is thus arranged to abut on a fixed pin 25c. A cam 26 is formed into one unified body with the auxiliary movable mirror 25. When the driving lever 10 rotates clockwise, an engaging pin 10e which is provided on the driving lever 10 engages the cam 26. Then, this causes the auxiliary movable mirror 25 to rotate clockwise to lift the main movable mirror 24 in conjunction with the driving lever 10 as shown in FIG. 5. The driving lever 10 has a light shielding member 27 secured thereto to prevent incidence of any undesirable light upon a film surface or the light sensitive element A.

Reference numerals 28 and 29 denote bounce preventing members which are respectively arranged to prevent the main and auxiliary movable mirrors 24 and 25 from bouncing when they hit the fixed pins 24c and 25c as they come from the condition shown in FIG. 5 back to the condition shown in FIG. 4. These members 28 and 29 are urged in the counterclockwise direction by springs.

Figure 6:
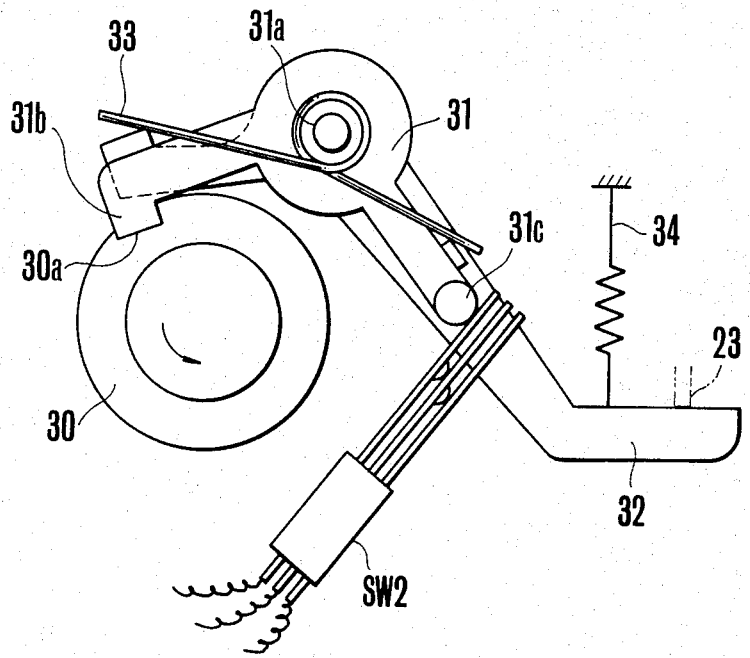
FIG. 6 is a plan view showing a film winding locking mechanism when the electromagnetic release device is in the states shown in FIGS. 1 and 2.
Figure 7:
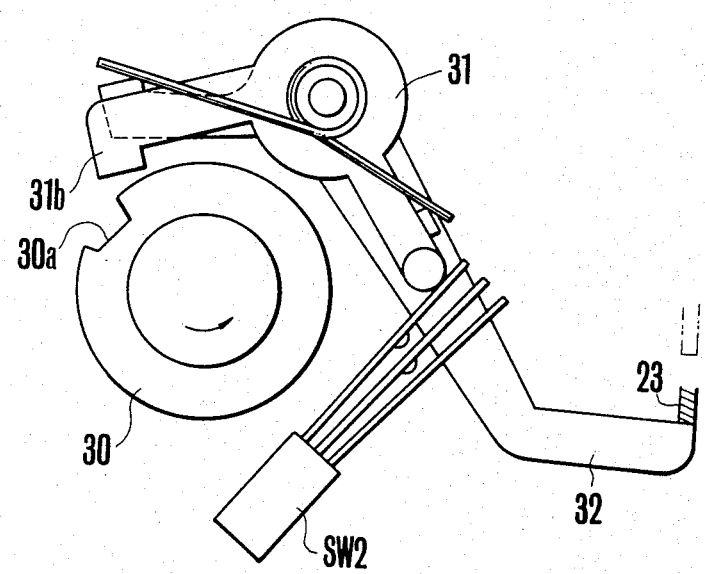
FIG. 7 is a plan view showing the film winding locking mechanism when the electromagnetic release device appears as shown in FIG. 3.

FIGS. 6 and 7 show the arrangement of the winding lock releasing mechanism which is operated by the movement of the above stated connection lever 23, the arrangement being shown by stage of the operation. In these drawings, a reference numeral 30 denotes a film winding locking drum which is interlocked with a film winding lever (not shown). The drum 30 is provided with a cut-out part 30a. A film winding locking lever 31 which is pivotally carried by a fixed shaft 31a has two extending parts. One of the extending parts of the lever 31 is provided with a winding locking claw 31b which is arranged to engage the cut-out part 30a of the winding locking drum 30. The other extending part of the film winding locking lever 31 is provided with a winding locking claw 31b which is arranged to engage the cut-out part 30a of the winding locking drum 30. The other extending part is provided with an engaging part 31c which is arranged to engage a switch SW2 for detecting a winding locking state. A winding locking drive lever 32 is pivotally carried by a fixed shaft 31a which is coaxial with the winding locking lever 31. The lever 32 is arranged to rotate together with the winding locking lever 31 through a buffer spring 33. A spring 34 urges the winding locking drive lever 32 to rotate in the direction of engaging the winding locking lever 31 with the winding locking drum 30 (or in the counterclockwise direction as viewed on the drawing). The above stated connection lever 23 is arranged as follows: When the lever is pushed to the left by the winding locking release lever 21 shown in FIG. 1, the lever 23 turns the winding locking drive lever 32 in the clockwise direction to disengage the winding locking claw 31b from the cut-out part 30a. This disengagement then permits a film winding operation.

The device according to the invention operates as described below:

In FIG. 1 which shows the device as in a state prior to this commencement of its operation, the central lever 3 is urged clockwise by the spring 11 but is kept in the position shown by the engagement between the hook part 2b of the first hook lever 2 and the first extending arm 3b of the central lever 3 as described in the foregoing. Further, the spring up lever 4 is in a position to rotate together with the central lever 3 with the hook part 6b of the second hook lever 6 engaging the fourth extending arm 3e of the central lever 3 in the condition shown in FIG. 1.

Further, in the condition shown in FIG. 1, the spring 15 is energized by a pin 32 secured to the central lever 3. Therefore, the operation control lever 7 is being urged clockwise. However, the permanent magnet which is provided at the electromagnet 9 attracts the armature disposed at one end of the operation control lever 7 to keep the lever 7 in the position as shown in FIG. 1 against the spring force of the spring 15.

When a release button which is not shown is depressed in this condition, a control circuit which is not shown is actuated by this depressing operation. With the control circuit thus actuated, power is supplied for a short period of time, to the electromagnet 9. With the power supplied, the retaining force that has been attracting the armature is nullified. This allows the spring 15 to cause the operation control lever 7 to begin to rotate clockwise. The cam 7b disposed at one end of the operation control lever 7 then engages the arm 2c of the first hook lever 2. The first hook lever 2 rotates counterclockwise against the spring force of the spring 13. This disengages the first extending arm 3b of the central lever 3 from the hook part 2b of the first hook lever 2. The central lever 3 then begins to rotate clockwise because of the force exerted by the spring 11. However, since the central lever 3 is engaged with the second hook lever 6 as described above, the lever 3 and the spring up lever 4 begin to rotate together in the clockwise direction.

Then, the extending arm part 4a of the spring up lever 4 engages the driving pin 10b. Therefore, the driving pin 10b rotates counterclockwise on the rotation shaft 10a as the spring up lever 4 rotates clockwise. The driving pin 10b moves upward while pushing away the retaining lever 8 which is being urged in the counterclockwise direction by the force of the spring 18. This causes the driving lever 10 on which the driving pin is erected to ascend. The ascent of the driving lever 10 then lifts up the movable mirrors 24 and 25 to extract them from the photo-taking optical path, that is, to extract them from their position of permitting observation of an object to be photographed, as shown in FIG. 4. With the mirrors thus lifted, the condition of FIG. 5 prevails. More specifically, with the driving lever 10 moving upward, the pin 10e secured to the driving lever 10 comes to engage the cam 26 which is formed integrally with the auxiliary movable mirror 25. This causes the auxiliary movable mirror to rotate clockwise. When the driving lever 10 further moves upward, the driving lever 10 and the auxiliary movable mirror 25 then abut the back side of the main movable mirror 24 to bring the mirror 24 upward together with the driving lever 10 and the auxiliary movable mirror 25. This results in the condition illustrated in FIG. 5.

Again referring to FIG. 1, the pin 32 of the fifth extending arm 35 of the central lever 3 which is charging the spring 15 rotates according as the central lever 3 rotates. One end of the spring 15 engages the stopper 7c disposed at one end of the operation control lever 7. The spring force of the spring 15 is grounded by this. Then, the force of the spring 17 causes the operation control lever 7 to quickly return and again the armature 9a comes into contact with the electromagnet 9.

The control circuit which is not shown has by then already cut off the power supply to the electromagnet 9. Therefore, the operation control lever 7 is again attracted to the electromagnet 9 by the magnetic force of the permanent magnet thereof. When the central lever 3 rotates further, the arm part 4b of the spring up lever 4 and the arm part 5b of the lever 5 engage each other to cause a clockwise rotation of the lever 5. The pin 5c which is secured to the lever 5 then engages one end of the spring 16. Further clockwise rotation of the lever 5 against the spring force of the spring 16 charges the spring 16 to urge the operation control lever 7 to move in the clockwise direction. This results in the condition shown in FIG. 2. At that instance, the second extending arm 3c of the central lever 3 pushes one of the contacts of the switch SW1 to open the normally closed switch SW1. With this switch opened, a shutter controlling counter which is not shown becomes operative.

The shutter is now actuated. When a signal representative of completion of the travel of a trailing shutter curtain is produced, again a power is supplied to the magnet 9 for a short period of time. With the power supplied, the armature retaining force of the magnet 9 is nullified. The operation control lever 7 is rotated clockwise by the spring force of the spring 16. The cam part 7d of the lever 7 engages the extending arm 6c of the second hook lever 6. The second hook lever 6 rotates counterclockwise against the force of the spring 14. This disengages the extending arm 3e of the central lever 3 from the hook part 6b of the second hook lever 6. Meanwhile, the other end 6d of the hook lever 6 engages the pin 19b disposed at one end of the third hook lever 19. The third hook lever 19 rotates clockwise against the force of the spring 20 to disengage the hook part 19c of the other end from the first arm part 21b of the winding lock releasing lever 21. The spring force of the spring 22 then causes the lever 21 to rotate counterclockwise. This in turn causes the connection lever 23 to move to the left. The winding lock releasing action of the connection lever 23 is illustrated by FIGS. 6 and 7. In a winding completed condition as shown in FIG. 6, the winding locking claw 30a is in fitting engagement with the cut-out part 30a of the winding locking drum 30 to inhibit the operation of the winding system which is interlocked with the drum 30. When the connection lever 23 is pushed leftward by the lever 21 (or downward as viewed in FIG. 6), the winding locking drive lever 32 rotates clockwise on the shaft 31a against the force of the spring 34. The winding locking lever 31 which is urged by the spring 33 then rotates clockwise to disengage the winding locking claw 31b from the cut-out part 30a of the drum 30. This disengagement results in a condition in which the film can be wound up as shown in FIG. 7. The rotation of the winding locking lever 31 causes the engaging part 31c to release the switch SW2 from its depressing action thereon. Therefore, the switch SW2 changes from a closed state to an open state and produces a signal representing a condition that permits film winding.

Referring again to FIG. 2, when the central lever 3 disengages the second hook lever 6, the spring up lever 4 is caused by the force of the spring 12 to rotate counterclockwise. The driving pin 10b of the driving lever 10 is also caused to rotate clockwise on the rotation shaft 10a by the spring force of the return spring 10c applied to the driving lever 10. As a result of this, the movable mirrors 24 and 25 come back to their original positions as shown in FIG. 4.

Meanwhile, the lever 5 also rotates clockwise as the spring up lever 4 rotates. The spring 16 which is attached to the operation control lever 7 abuts on the stopper 7f secured to the lever 7. The spring force of the spring 16 is nullified and then the operation control lever 7 is caused to rotate counterclockwise by the force of the return spring 17. The counterclockwise rotation of the operation control lever 7 then brings the armature 9a into contact with the electromagnet 9 for the third time.

Since, by this time, the power supply to the electromagnet 9 has already been cut off by the control circuit which is not shown, the armature 9a is stuck to the electromagnet 9.

The driving pin 10b begins to abut on the retaining lever 8 and causes the lever 8 to rotate clockwise against the force of the spring 18 which is urging the lever 8. This results in the condition as shown in FIG. 5.

Then, due to a bounce, the driving pin 10b attempts to move upward. However, this is prevented by the retaining lever 8 with the bounce absorbed by the clamping action of the lever 8.

Under this condition, when the lever 3 is rotated in the direction of arrow as shown in FIG. 3 by a known winding system, the parts 3b, 3e and 3d of the lever 3 respectively engage the hook lever 2, the hook lever 6 and the winding lock releasing lever 21. Then the device comes back to the condition as shown in FIG. 1.

In accordance with this invention, the electromagnetic mechanism is arranged to be repeatedly driven to control different kinds of actions such as shutter release, mirror return, unlocking the film winding lock by means of a single electromagnetic arrangement. The invented arrangement, therefore, obviates the necessity of providing many electromagnetic mechanisms for converting electrical control signals into mechanical signals in carrying out an electrical sequence control. The invention therefore permits simplification of structural arrangement, reduction in spaces required, etc. and eventually permits reduction both in the size and cost of a camera.

Further, in accordance with the invention, the repeated driving action on the electromagnetic mechanism is arranged to be aided by the spring mechanism which varies its urging force according to the way the sequence of actions proceeds. This ensures that the electromagnetic arrangement according to the invention operates without fail even when the invention is applied to a camera arranged to carry out a sequence of actions within a short period of time.

What we claim:

1. A camera having an electromagnetic release device, comprising:

an elastic member;

electromagnetic means arranged to be reciprocally driven by combined action of an electromagnetic force and said elastic member for performing shutter release by a first drive;

winding locking means for inhibiting a film winding operation;

winding lock releasing means for releasing the operation of said winding locking means; and said releasing means being arranged for releasing the operation of said winding locking means in response to a second drive of said electromagnetic means.

2. A camera having an electromagnetic release device, comprising:

electromagnetic means to be operated by an electromagnetic force;

control means for controlling a sequence of actions, said control means being arranged to be repeatedly operated by said electromagnetic means;

return means for allowing said control means to be repeatedly operated, said return means being arranged to return the control means to the original position thereof to be operated again by said electromagnetic means after completion of each action performed by the control means;

starting means for stating a photographic operation, said starting means being arranged to be actuated by the first action of said control means;

ending means for ending the photographic operation, said ending means being arranged to be actuated by the second action in the sequence of actions of said control means; and said return means including urging means arranged to vary the urging force thereof as the sequence of actions proceeds.

3. A camera according to claim 2, further including:

winding locking means for inhibiting a film from being wound, said locking means being arranged to be rendered inoperative by said ending means.

4. A camera according to claim 3, further including:

a movable mirror for guiding a light from an object to be photographed to a location outside of a photographic optical path, said mirror being arranged to ascend when said starting means is actuated and to descend when said ending means is actuated.

5. A camera having an electromagnetic release drive, comprising:

a photographic mechanism;

drive means for driving said photographic mechanism;

control means for performing sequential control over said drive means, said control means being arranged to be reciprocally driven more than one time between a first position and a second position during one operation of said photographic mechanism;

electromagnetic means for holding said control means in said first position, said electromagnetic means being arranged to have the holding force for holding the control means thereof varied by a power supply thereto;

first bias means for moving said control means to said second position, said first bias means being arranged to vary the bias force thereof in accordance with movement of said drive means; and second bias means for moving said control means from the second position to the first position in accordance with the variation of the biasing force of said first bias means.

6. A camera according claim 5, wherein said photographic mechanism includes:

winding locking means for inhibiting a winding operation on a film, said locking means being actuated at the completion of a film wind-up; and winding lock releasing means for releasing said winding locking means, said releasing means being actuated at the completion of a photographic operation.

7. A camera according to claim 5 or 6, wherein said photographic mechanism includes:

a movable mirror which retracts from the optical axis at the start of photographing and turns back to the optical axis at the completion of photographing.

8. An electromagnetic release device for a camera having film winding means for performing a film winding operation and winding locking means for inhibiting the film winding operation of said film winding means, comprising:

an elastic member;

electromagnetic means arranged to be reciprocally driven by combined action of an electromagnetic force and said elastic member for performing shutter release by a first drive;

winding lock releasing means for releasing the operation of said winding locking means; and said releasing means being arranged for releasing the operation of said winding locking means in response to a second drive of said electromagnetic means.

9. An electromagnetic release device for a camera having starting means for starting a photographic operation and ending means for ending the photographic operation, comprising:

electromagnetic means to be operated by an electromagnetic force;

control means for controlling a sequence of actions, said control means being arranged to be repeatedly operated by said electromagnetic means;

return means for allowing said control means to be repeatedly operated, said return means being arranged to return the control means to the original position thereof to be operated again by said electromagnetic means after completion of each action performed by the control means;

said starting means being arranged to be actuated by the first action of said control means;

said ending means being arranged to be actuated by the second action in the sequence of actions of said control means; and said return means including urging means arranged to vary the urging force thereof as the sequence of actions proceeds.

10. An electromagnetic release device for a camera according to claim 9, wherein the camera includes locking means for inhibiting a second operation, said locking means being arranged to be rendered inoperative by said ending means.

11. A device according to claim 10, wherein the camera includes a movable mirror for guiding a light from an object to be photographed to a location outside of a photographic optical path, the mirror being arranged to ascend when said starting means is actuated and to descend when said ending means is actuated.

12. For a camera having a photographic mechanism and drive means for driving said photographic mechanism, an electromagnetic release drive, comprising:

control means for performing sequential control over said drive means, said control means being arranged to be reciprocally driven more than one time between a first position and a second position during one operation of said photographic mechanism;

electromagnetic means for holding said control means in said first position, said electromagnetic means being arranged to have the holding force for holding the control means thereof varied by a power supply thereto;

first bias means for moving said control means to said second position, said first bias means being arranged to vary the bias force thereof in accordance with movement of said drive means; and second bias means for moving said control means from the second position to the first position in accordance with the variation of the biasing force of said first bias means.

13. An electromagnetic release device according to claim 12, wherein said photographic mechanism of said camera includes winding locking means for inhibiting a winding operation of a film, the locking means being actuated at the completion of a film wind-up, and further comprising:

winding lock releasing means for releasing said winding locking means, said releasing means being actuated at the completion of a photographic operation.

14. A release drive according to claims 12 or 13, wherein the camera includes a mirror, and said electromagnetic release device causes the movable mirror in said photographic mechanism to retract from the optical axis at the start of photography and turn back to the optical axis at the completion of photography.

* * * * *